(12) United States Patent
Sturies et al.

(10) Patent No.: US 6,315,510 B1
(45) Date of Patent: Nov. 13, 2001

(54) SCREW GROMMET

(75) Inventors: Jens Sturies, Wettstetten; Karsten Rehberg, Igersheim, both of (DE)

(73) Assignee: ITW-Ateco G.m.b.H., Rottingen (DE)

( * ) Notice: Subject to any disclaimer, the term of this patent is extended or adjusted under 35 U.S.C. 154(b) by 0 days.

(21) Appl. No.: 09/605,525

(22) Filed: Jun. 29, 2000

(30) Foreign Application Priority Data

Jul. 5, 1999 (DE) .............................................. 199 30 728

(51) Int. Cl.⁷ .............................. F16B 13/06; F16B 37/04
(52) U.S. Cl. ......................... 411/182; 411/60.2; 411/508
(58) Field of Search ........................... 411/55, 60.2, 182, 411/183, 508, 509, 510

(56) References Cited

U.S. PATENT DOCUMENTS

| | | |
|---|---|---|
| 4,948,314 * | 8/1990 | Kurosaki ............................... 411/182 |
| 5,269,640 * | 12/1993 | Jonishi et al. .................... 411/182 X |
| 5,294,225 * | 3/1994 | Kazino et al. ........................ 411/182 |
| 5,340,257 * | 8/1994 | Morassutti ........................ 411/182 X |

FOREIGN PATENT DOCUMENTS

| | | |
|---|---|---|
| 2902123 | 3/1980 | (DE) . |
| 441691 | 8/1991 | (EP) . |
| 26717248 | 12/1988 | (FR) . |

* cited by examiner

*Primary Examiner*—Neill Wilson
(74) *Attorney, Agent, or Firm*—Lowe Hauptman Gilman & Berner, LLP

(57) ABSTRACT

A plug for the aattachment of a threaded fastener in a throughbore in sheet material, particularly metal sheet, comprising a plug body adapted to be plugged into the throughbore and having a bore oriented in plugging direction, wherein the body has a sealing collar forming a stop during plugging action, the collar extending radially outwardly and having an annular sealing surface facing in plugging direction.

23 Claims, 3 Drawing Sheets

SCREW GROMMET

FIELD OF THE INVENTION

The invention relates to a screw grommet (or plug) used for fastening panels together and to a method for manufacturing such a plug.

DESCRIPTION OF THE RELATED ART

Generally plugs are connection elements which are pushed or pressed into preformed holes in order to connect two components by friction or wedging.

For fastening screws in bores of a component there are known various forms of plug which vary depending on the nature and the material of the component and/or of the screw. For fastening screws in through-bores in sheet material, in particular metal sheet, so-called grommets are known. These consist usually of plastic. They are inserted into the through-bore where they are prepositioned by way of a slight press fit and/or by way of saw-tooth-shaped projections on their outer contour. Subsequently a screw is screwed into a fastening bore in the grommet, the fastening bore being orientated in the plugging direction, wherein usually the thread of the screw digs into a corresponding contour of the walling of the fastening bore. With this the screw widens the grommet or plug sticking in the bore, by which means a rigid friction and/or positive fit connection to the wall of the bore arises. A component which is to be fastened to the surface of the metal sheet is then held under the head of the screw and via the screw and the grommet is rigidly connected to the surface of the metal sheet.

Such a fastening is particularly applied in the construction of automobiles in order for example to fasten bumper strips or number plate holders to the car body or to attach wheel housing shells in the wheel guard.

In order to ensure corrosion protection it is necessary that after the attachment of the grommet and of the screw, moisture may no longer penetrate into the inner side of the metal sheet. For this usually sealing rings are applied which must be preassembled with the grommet or the through-bore, or sealing masses are attached at suitable locations before the assembly of the grommet. This is particularly disadvantageous with the large scale production in automobile construction since every additional assembly step, thus also the attachment of seals, causes additional costs.

SUMMARY OF THE INVENTION

It is the object of the invention to supply a plug for fastening a screw in a through-bore of a sheet material, in particularly metal sheet, and a method for its manufacture which seals the through-bore when the screw is fastened.

According to the invention this object is achieved by a plug for fastening a screw in a through-bore of a sheet material, in particular a metal sheet which has a plug body dimensioned to be insertable into the throughbore, and a fastening bore, for receiving a screw, which is orientated in the direction of plugging. Preferably accordingly the plug body extends elongately around the fastening bore and is preferably cylindrical, e.g. circularly cylindrical, or tapers somewhat towards its tip. According to the invention a sealing collar extends radially outwards around the plug body and on plugging the plug into the through-bore serves as an abutment. The sealing collar comprises an annular, e.g. circular annular sealing surface which is orientated in the direction of plugging and sealingly cooperates with the surface of the edge of the metal sheet through-bore when the sealing collar abuts here on insertion of the plug into the through-bore. Preferably the fastening bore in the plug body is a blind hole whose wall has an uninterrupted surface and integrally connects to the sealing surface. This has the effect that the plug completely sealingly closes the through-bore as soon as the sealing surface completely occludes with the edge of the through-bore.

Preferably the sealing surface is a sealing lip which projects in the plugging direction axially from the sealing collar and sealingly forms possible unevenness of the surface of the edge of the through-bore. This also permits the use of the plugs with metal sheets of thickness which are different within certain limits.

Preferably at least the sealing surface of the sealing collar is formed of a softer plastic than the plug body. By way of this these two elements of the plug according to the invention meet their respective demands particularly well: the hard plastic of the plug body may ensure the demanded strength and stiffness for a secure connection of the metal sheet to the screw, whilst the soft plastic may be flexibly adapted to the surface of the metal sheet and thus seals particularly well.

Preferably such a plug is manufactured by way of a method according to the invention, in which firstly the plug body of the first, hard plastic is injection moulded in the known manner in a first mould, the plug body is then applied into a second mould in which the sealing collar of the soft, second plastic is injection moulded around the plug body. The second plastic is preferably an elastomer.

An alternative method according to the invention envisages the plug body to be manufactured from the first hard plastic with the sealing collar of the second, soft plastic simultaneously in a suitable known 2-component tool of a suitable injection molding machine.

The plug body comprises on its outer contour preferably saw-tooth-shaped projections which in the plugging direction axially in front of the sealing collar are arranged uniformly distributed on the circumference of the sealing body and whose inclination in the plugging direction runs flatly so that on inserting the plug they slide through the through-bore without great resistance, the other flank however being so steep that the plug, i.e. under bias of the sealing lip does not press itself out of the through-bore. The plug may according to the invention also comprise more than one set of saw-tooth-shaped projections, wherein the sets then are arranged at different distances from the sealing collar in order to be able to use the plugs with metal sheets of still differing metal sheet thicknesses.

BRIEF DESCRIPTION OF THE DRAWINGS

The invention is hereinafter described with reference to the appended drawings.

DETAILED DESCRIPTION OF THE INVENTION

Figure 1:
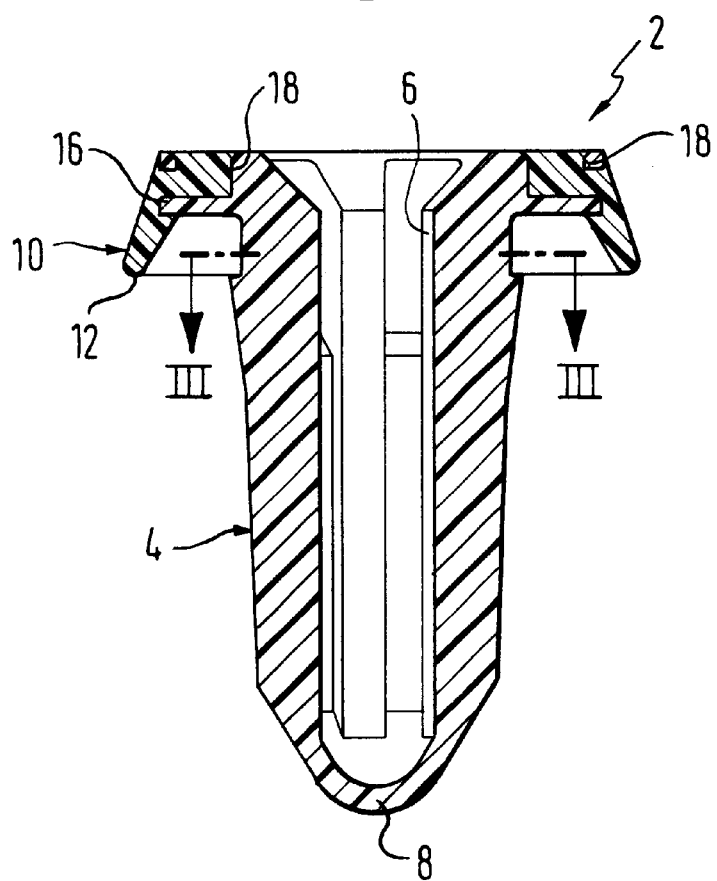
FIG. 1 shows a sectioned lateral view of a plug according to the invention.

FIG. 1 shows the sectioned lateral view of a plug or grommet 2 according to the invention. The plug 2 comprises an elongate plug body 4 with a fastening bore 6 for a screw (not shown). The plug body 4 consists of plastic. The wall of the fastening bore 6 has webs running in the longitudinal direction into which the thread of the screw digs when this screw is screwed into the plug 2. Alternative formations of the inner contour of the fastening bore are possible in all conceivable shapes which are suitable for anchoring screw-like or similar fastening means. Also a smooth inner contour with e.g. a cylindrical shaping tapering conically into the bore is accordingly possible.

The fastening bore 6 is formed as a blind hole in the plug body 4, which means that the inner space of the fastening bore 6 with the exception of its entry opening is completely enclosed by the plug body 4 and does not comprise any further perforations. At the end which lies opposite the end of the elongate body 4 at which the entry opening of the fastening bore is formed, the plug body is provided with a rounded tip 8. With the tip in front, the plug 2 is inserted into a preformed through-passage bore (20 in FIG. 4) in a metal sheet. This plugging movement is limited by a sealing collar 10 which extends radically outwards around the plug body 4. The sealing collar 10 comprises a circular annular sealing surface 12 which in the shape of a sealing lip 12 is orientated and projects axially in the plugging direction, that is to say in FIG. 1 downwards. The metal sheet 14 abuts against the sealing lip 12 (this may be recognized with reference to FIG. 5) when the plug 2 is completely inserted into a through-passage bore in the metal sheet 14. With this the sealing lips depending on the metal sheet thickness deforms to a differing extent and permits thus the use of the plug 2 according to the invention with metal sheets having difference thicknesses with certain limits.

The sealing lip 12 consists of a second plastic which is softer that the plastic of which the sealing body 4 consists. By way of this the sealing lip 12 is more flexible and may better form on the surface of the metal sheet and occlude tightly with the edge of the through-bore in the metal sheet.

The sealing lip 12 is injection moulded around the sealing body 4 so that there arises the integral component 1 represented in FIG. 1 with a plug body 4 of rigid stiff material for a solid connection and a sealing collar 10 with the sealing lip 12 of a soft flexible plastic for a reliable sealing.

So that on injection molding the sealing collar 10 around the plug body 4 there arises an intimate connection between the two different plastics, the plug body 4 comprises a collar shoulder 16 which extends radially outwards around the plug body 4 and has anchoring channels 18 into which the soft plastic of the sealing lip 13 flows when injecting the sealing lip 12 around the plug body 4 and ensures a large-surfaced anchoring of the soft plastic.

Figure 2:
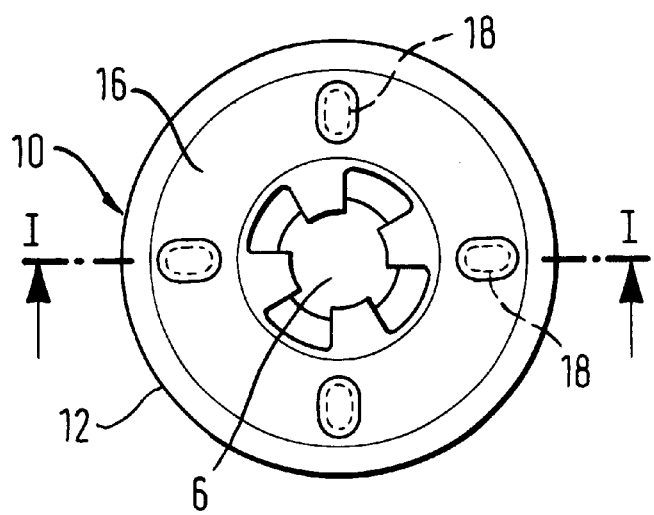
FIG. 2 shows an unsectioned plan view of the plug according to FIG. 1

In FIG. 2 it can be recognized that the anchoring channels 18 in the collar shoulder 16 of the sealing collar 10 are uniformly distributed on the circumference at four locations. Furthermore it can be recognized that the sealing lip 12 extends concentrically around the opening of the fastening bore 6 for the screw (not shown). Also here it is clear that with a sealed closure of the sealing lip 12 with the edge of a through-bore in a metal sheet this through bore is completely sealed by the plug 2 because the fastening bore, as is already recognizable in FIG. 1, is formed as a blind hole without further perforation whose wall integrally connects to the sealing lip 12.

Figure 3:
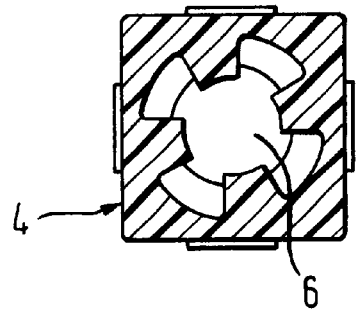
FIG. 3 shows a plan view of the plug according to FIG. 1, which is sectioned along line B—B in FIG. 1.

FIG. 3 shows a section through the plug body 4 along B—B in FIG. 1 and makes clear that the plug body 4 in its middle region between the insert end with the tip 8 and the end with the entry opening of the fastening bore 6 is formed cylindrically and specifically square cylindrically. This plug 2 is thus provided for a through-bore in a metal sheet with a square contour of a corresponding edge length. Of course the plug 2 may also be designed for circular through-bores in metal sheets and accordingly have a circularly cylindrical plug body 4.

Figure 4:
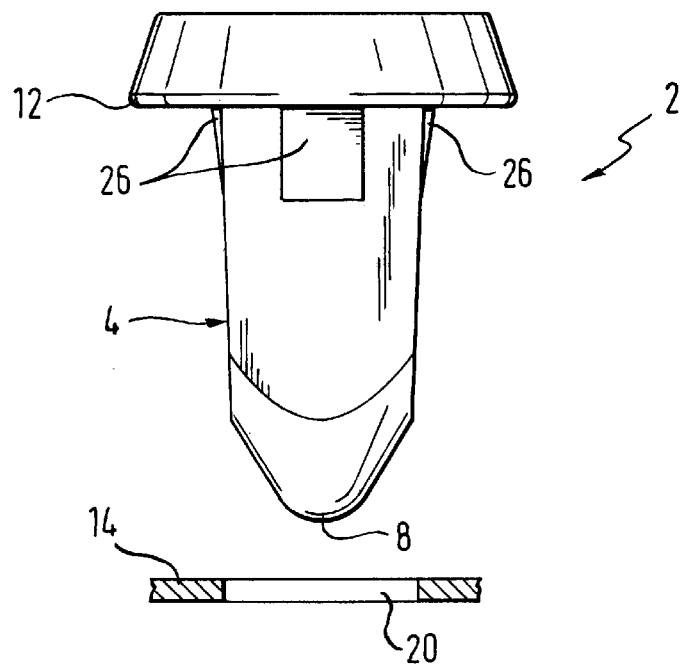
FIG. 4 shows the lateral view according to FIG. 1 unsectioned with a metal sheet with a through-bore.

FIG. 4 show the plug 2 according to FIG. 1 unsectioned, shortly before it is inserted into a through-bore 20 in a metal sheet 14. Recognizable is the not yet deformed sealing lip 12 which with a completely inserted plug 2 forms the abutment and sealing surface, which is shown with respect to FIG. 5.

Figure 5:
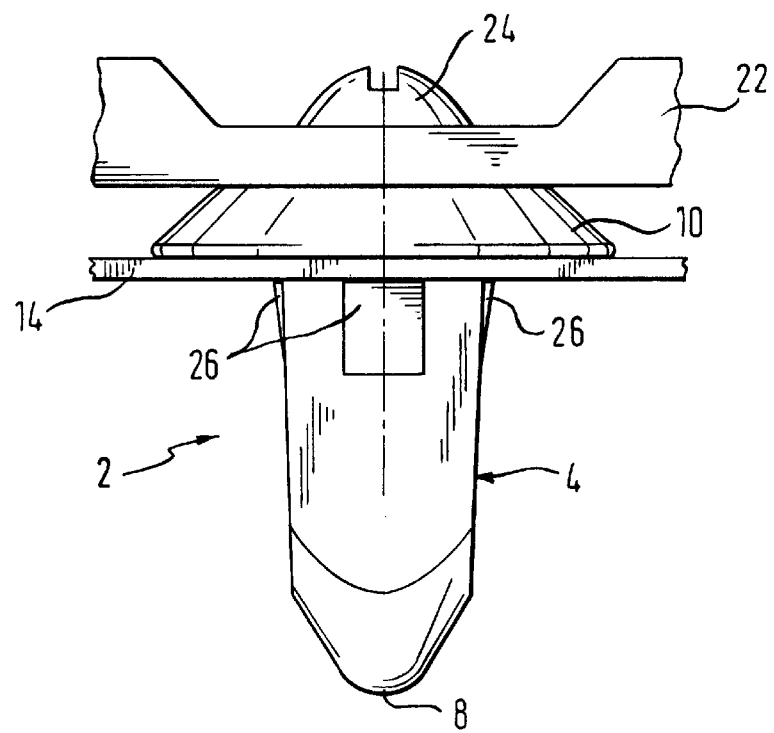
FIG. 5 shows the plug according to FIG. 1 in a screwing of a plastic part to a metal sheet.

In FIG. 5 the plug 2 is completely inserted into the through-passage in the region 14, and a plastic part 22 is fastened on the metal sheet 14 with a screw which is screwed into the fastening bore of the plug 2. From FIG. 4 it is clear that the plastic part 22 from the head of the screw 24 is not pressed directly onto the metal sheet 14 but against the upper side of the sealing collar 10 of the plug 2 which offers the additional advantage of decoupling oscillations between the metal sheet 14 and the plastic part 22 with a connection by way of the plug 2 according to the invention.

Furthermore with reference to FIG. 5 it is recognizable that saw-tooth-shaped projections 26 which are arranged uniformly on the circumference in the plugging direction in front of the sealing collar 10 hold the plug 2 on prepositioning on the through-bore of the metal sheet 14 and prevent the plug 2 under bias of the deformed sealing lip 12 from being pressed out of the prepositioning. The saw-tooth-shaped projection 26 for this comprise a flank running flatly in the plugging direction so that the saw-tooth-shaped projections 26 on plugging the plug through the through-bore may slide through without great resistance. The other flank of the saw-tooth-shaped projection 26 is in contrast so steep that it lockingly cooperates with the edge of the through-bore and blocks the plug 2 against a pulling out of the through-bore.

Figure 6:
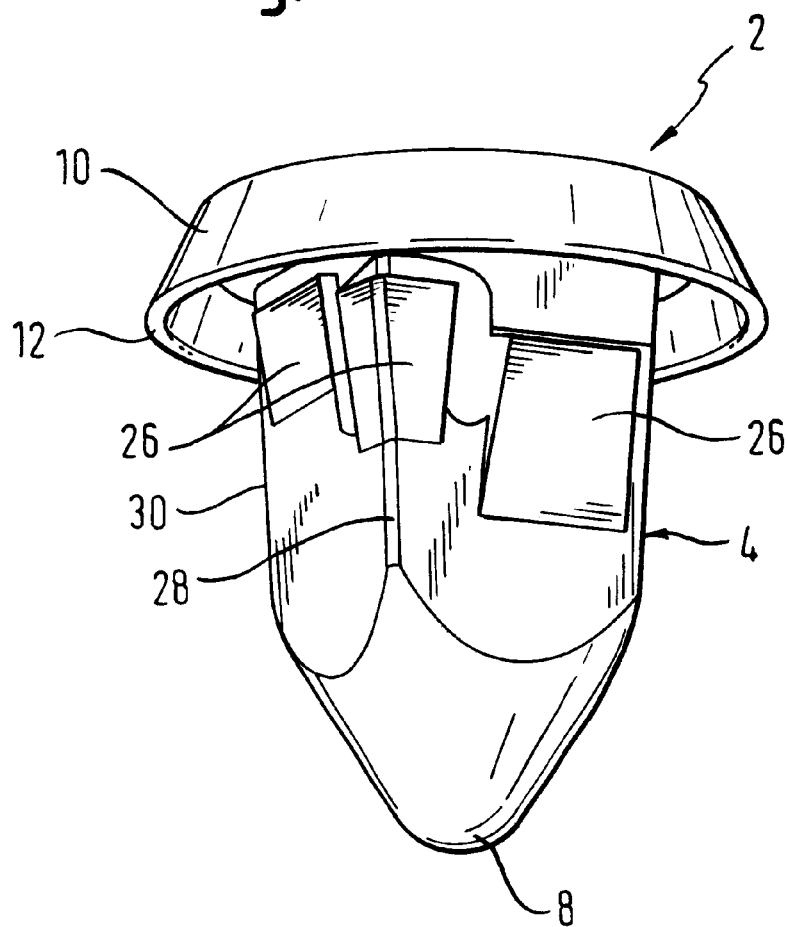
FIG. 6 shows a special lateral view of an alternative embodiment form of a plug according to the invention with several sets of saw-tooth-shaped projections for differing metal sheet thicknesses.

In order to be able to further vary the metal sheet thickness than the elasticity of the sealing lip permits, according to FIG. 6 the plug 2 in one formation of the invention may also comprise more than one set of saw-tooth-shaped projections 26, wherein the sets are arranged differently distanced from the sealing collar 10. The plug is then inserted so far into the preformed bore in the metal sheet until the sealing lip 12 completely and slightly biased bears against the upper side of the metal sheet (not shown), wherein those sets of saw-tooth-shaped projections 26 whose distance to the sealing lip lower side corresponds to the metal sheet thickness engage with the lower side of the bore (not shown). In the embodiment form shown in FIG. 6 each of the in total three sets of saw-tooth-shaped projections 26 are in each case formed by a pair of saw-tooth-shaped projections of which in the view represented in each case only one saw-tooth-shaped projection can be recognized, whilst the associated other one is arranged covered on the oppositely lying side of the square cylindrical plug body 4. The pair of saw-tooth-shaped projections 26 which is closet to the sealing collar 10 is located on both, in this perspective lateral, surfaces of the square-cylindrical plug body 4, the pair of saw-tooth-shaped projections 26 which is further away from the sealing collar 10 is located on the front and rear surface of the square-cylindrical plug body 4 and the pair of saw-tooth-shaped projections 26 with the middle distance to the sealing collar 10 is arranged on diagonally opposite edges 28 between these surface pairs. The saw-tooth-shaped projections 26 of this pair with the middle distance to the sealing collar 10, for an easier spring deflection on inserting through the bore, are undercut in the metal sheet. Also the other edge pair 30 may comprise a further pair of saw-tooth-shaped projections with yet another distance to the sealing collar in order to further extend the possible range of metal sheet thicknesses.

Figure 7:
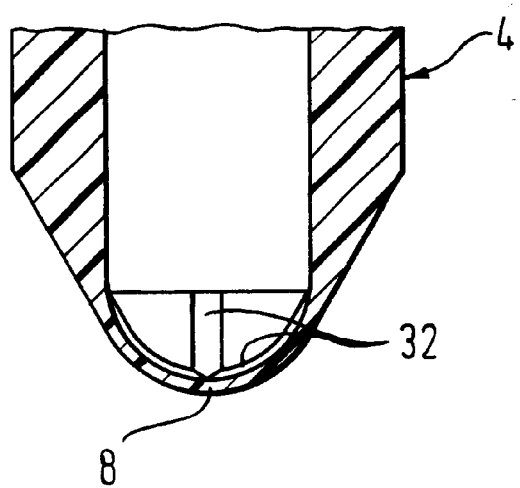
FIG. 7 shows a sectioned lateral view of the tip of the plug body as a cutout of an alternative embodiment form of a plug according to the invention.

According to FIG. 7 in a further embodiment form of the invention the plug body 4 at its rounded tip 8 comprises lines of weakness 32 which however do not perforate the plug body. These for letting the tip 8 tear in a controlled manner with the use (e.g. unintentional) of a screw which is too long which thus with reference to FIG. 5 with a fastening with the plug 4 projects through the tip, so that the tear edges may sealingly bear against the screw which here penetrates through.

What is claimed is:

1. A screw grommet, comprising a body including an enlarged upper part, a middle part, and a lower part arranged in that order along an axis of said body;
    said body further including a screw receiving hole extending along said axis from a top surface of the upper part, through the middle part, and ending in the lower part;
    the upper part being provided with a sealing collar extending circumferentially of and obliquely radially outwardly from said body and toward the lower part, the sealing collar having a sealing surface at a lower end thereof, wherein said body is formed of a first plastic material and the sealing collar is formed of a second plastic material softer than the first plastic material.

2. The screw grommet of claim 1, wherein the upper part includes a shoulder axially spaced from the top surface of the upper part and extending radially outwardly from said body to form an enlarged contact area between the first and second plastic materials.

3. The screw grommet of claim 1, wherein the second plastic material is an elastomer.

4. The screw grommet of claim 2, wherein the sealing collar extends from both the top surface of the upper part and a lower surface of the shoulder.

5. The screw grommet of claim 1, wherein the screw receiving hole is a blind hole.

6. The screw grommet of claim 1, wherein the middle part of said body includes at least one saw-tooth-shaped projection having a locking step portion formed close to the upper part, and a guiding tapered portion formed close to the lower part.

7. The screw grommet of claim 6, wherein the middle part includes multiple saw-tooth-shaped projections with the locking step portions thereof positioned at various axial spacings to the sealing surface.

8. The screw grommet of claim 1, wherein the lower part includes at least one weakened region adapted to be punctured by a screw screwed into said screw receiving hole, and to sealingly bear against said screw.

9. The screw grommet of claim 1, wherein the sealing collar is formed integrally with said body by injection molding the second plastic material around the upper part of said body.

10. The screw grommet of claim 1, wherein the sealing collar is formed integrally with said body by contemporary injection molding of said body of the first plastic material in a first portion of an injection mold, and of the sealing collar of the second plastic material about the upper part of said body in a second portion of the injection mold.

11. The screw grommet of claim 6, wherein the locking step portion is substantially co-elevational with the sealing surface.

12. The screw grommet of claim 7, wherein the middle part has a quadrangle exterior cross section, and at least one of said multiple saw-tooth-shaped projections is positioned at a corner of the quadrangle-cross-sectioned middle part.

13. The screw grommet of claim 8, wherein said at least one weakened region is formed as a recess in an inner wall of said screw receiving hole in the lower part of said body.

14. In combination,
    a panel-like member having upper and lower surfaces, and a through hole communicating said upper and lower surfaces;
    a screw grommet comprising a body including an enlarged upper part, a middle part and a lower part arranged in that order along an axis of said body, said body further including a screw receiving hole extending along said axis from a top surface of the upper part through the middle part and ending in the lower part, said screw grommet being inserted into the through hole of the panel-like member with the upper part stopped by said upper surface and the middle and lower parts passed through the through hole; and
    a screw screwed into the screw receiving hole, thereby causing said body to expand radially outwardly to fit tightly with an inner wall of the through hole;
    wherein the upper part of said body is provided with a sealing collar extending circumferentially of and obliquely radially outwardly from said body and toward the lower part, the sealing collar has, at a lower end thereof, a sealing surface resting on said upper surface of the panel-like member; and
    wherein said body is formed of a first plastic material and the sealing collar is formed of a second plastic material softer than the first plastic material for forming a reliable seal when the sealing collar is pressed by a head portion of the screw screwed into the screw receiving hole.

15. The combination of claim 14, wherein the upper part includes a shoulder axially spaced from the top surface of the upper part and extending radially outwardly from said body to form an enlarged contact area between the first and second plastic materials.

16. The combination of claim 14, wherein the second plastic material is an elastomer.

17. The combination of claim 15, wherein the sealing collar extends from both the top surface of the upper part and a lower surface of the shoulder.

18. The combination of claim 14, wherein the screw receiving hole is a blind hole.

19. The combination of claim 14, wherein the middle part of said body includes at least one saw-tooth-shaped projection having a locking step portion formed close to the upper part, and a guiding tapered portion formed close to the lower part, said guiding tapered portion slightly deforms to allow the middle part to pass through the through hole until said lower surface of the panel-like member comes to rest on said locking step portion, thereby preventing the screw grommet from popping out of the through hole.

20. The combination of claim 19, wherein the middle part includes multiple saw-tooth-shaped projections with the locking step portions thereof positioned at various axial spacings to the sealing surface, thereby allowing the panel-like member of various thickness to be fastened.

21. The combination of claim 14, wherein the lower part includes at least one weakened region adapted to be punctured by the screw screwed into the screw receiving hole, and to sealingly bear against the screw.

22. The combination of claim 21, wherein said at least one weakened region is formed as a recess in an inner wall of the screw receiving hole in the lower part of said body.

23. A plug adapted to be pushed into a through bore formed in a sheet-like member, said plug comprising a body including an upper part, a middle part, and a lower part arranged in that order along an axis of said body;

said body further including a screw receiving hole for receiving a screw therein, said screw receiving hole extending from a top surface of the upper part along said axis of said body;

the upper part being provided with a sealing collar adapted to form a stop when said plug is pushed into said through bore, said sealing collar extending radially outwardly from said body and toward the lower part, said sealing collar having a sealing surface at a lower end thereof;

wherein the middle part of said body includes multiple saw-tooth-shaped projections each having a locking step portion for allowing the plug to be easily pushed into said through bore and for locking and preventing the plug from popping out of said through bore; and wherein the multiple saw-tooth-shaped projections are positioned at various axial spacings to the sealing surface.

* * * * *